Patented July 26, 1949

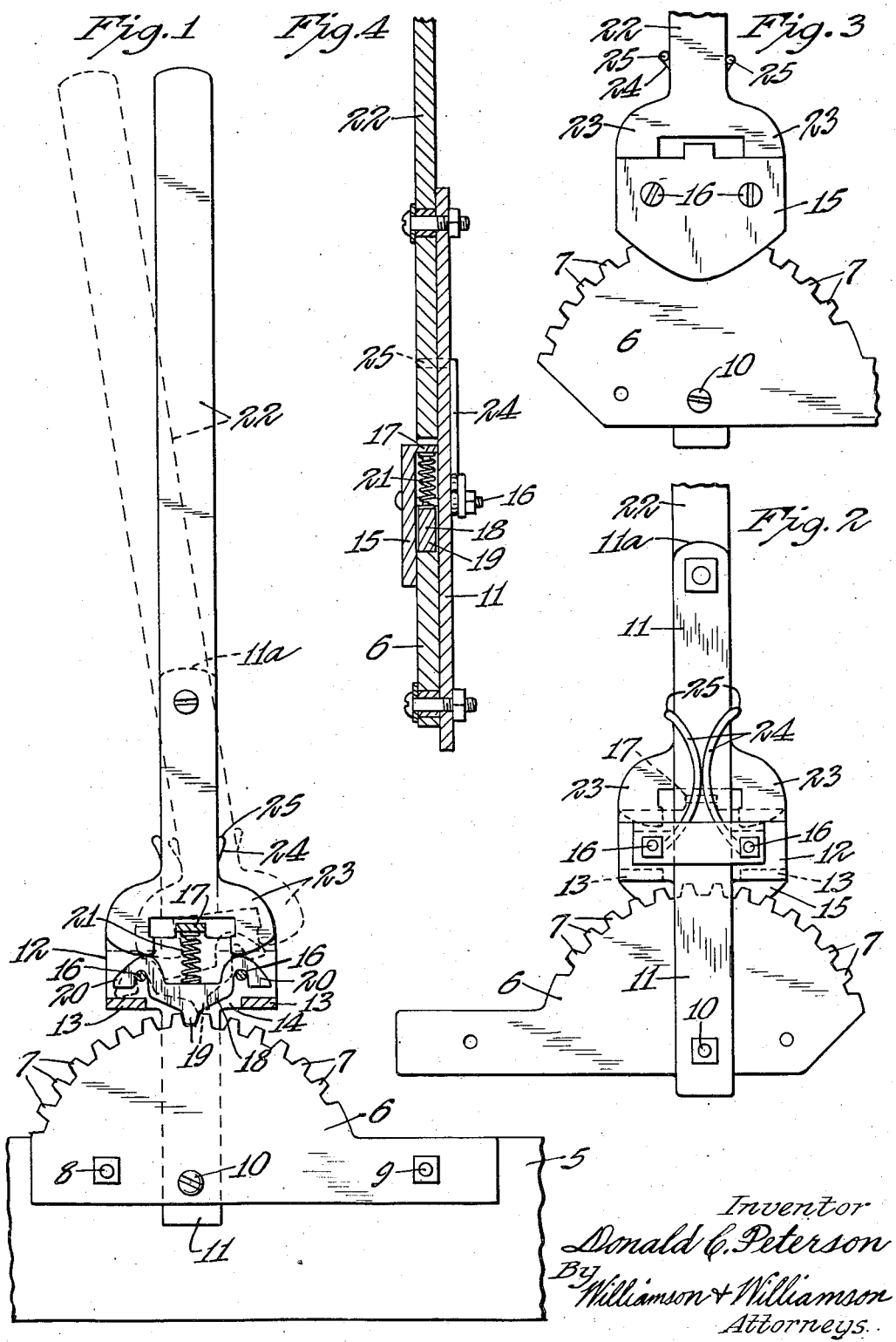

2,477,140

UNITED STATES PATENT OFFICE 2,477,140

DOUBLE-ACTING PAWL

Donald C. Peterson, Graceville, Minn.

Application December 18, 1945, Serial No. 635,697

4 Claims. (Cl. 74—536)

This invention relates to a double acting pawl unit.

It is an object of the invention to provide a relatively simply constructed yet highly efficient double acting pawl particularly adapted for use in connection with an arcuate rack wherein the pawl can be readily shifted in either direction and wherein it is held in firm engagement with the rack when shifted to the desired position.

Another object of the invention is to provide a double acting pawl unit having spring influenced locking means which will positively insure maintenance of the pawl in its desired position.

A further object of the invention is to provide an improved pawl construction which is capable of many adaptations but it is of particular advantage in combination with an actuating lever by means of which the pawl unit can be connected to a remotely positioned part to be adjustably moved.

The above and other objects and advantages of the invention will more fully appear from the following description made in connection with the accompanying drawings, wherein like reference characters refer to the same parts throughout the views, and, in which:

Figure 1 is a side elevation of a pawl and rack assembly with a portion of the pawl in section and the pawl controlling means in alternate positions in full and dotted lines;

Figure 2 is a side elevation of the opposite side of the unit from Figure 1 with the upper portion of the actuating lever broken away;

Figure 3 is a side elevation of the unit as viewed in Figure 1 with the side face and guide member in position and with upper portions broken away; and Figure 4 is a longitudinal vertical sectional view through the unit.

There is illustrated in Figure 1 a portion of a horizontal member 5 which may be a portion of a machine frame of any type.

Secured to the frame member 5 is an arcuate toothed rack 6 whose spaced teeth 7 lie about the curved portion thereof. The rack is secured by nutted bolts 8 and 9 to the frame 5.

Pivotally mounted to the lower central portion of the rack 6 as at 10 is a lever 11 terminating at 11a. Intermediate the ends of the lever 11 is a cross member 12 having a horizontal web 13 extending therefrom, said web 13 being cut away to provide a central opening 14 as best shown in Figure 1. Secured to the edge of the web 13 and extending above and below the same is a side plate 15 mounted upon nutted bolts 16 which extend through the cross member 12, and the side plate 15 is provided with an inwardly extending tongue 17 which bears against the lever 11. Therefore, the side plate 15 is spaced from the cross member 12 by reason of the web 13 and the tongue 17. Lying between the cross member 12 and the side plate 15 is a pawl element 18 having a medial downwardly extending portion 19 shaped to lie between the teeth 7 on the rack 6. Extending laterally in opposite directions from the medial portion of the pawl 18 are hooked arms 20 which are adapted to overlie and be supported by bolts 16. As shown in Figure 1, the pawl element 18 lies loosely in the frame or casing provided by the cross member 12 and the side plate 15 so that the pawl can rock with one of the arms 20 or the other moving upwardly away from its supporting bolt 16.

Pivotally connected to the upper end of the lever 11 and extending considerably thereabove is an actuating member 22. The lower end of said actuating lever 22 is provided with a pair of spaced cam arms 23 which lie at either side of the tongue 17 on the side plate 15 and extend below the upper edge of said side plate 15 into close proximity with the upper rounded portions of the cam arms 20.

Mounted on each of the two bolts 16 is a bowed spring 24 and each spring is provided with a horizontally bent upper end 25, best shown in Figure 4. The upper spring ends 25 are adapted to engage opposite edge portions of the lever 11 and the second lever 22 and the springs function to normally maintain the lever 22 in alignment with the lever 11.

When the device is in the full line position of Figure 1 the spaced cam arms 23 have their lower ends lying closely adjacent each of the arms of the pawl 18, thereby preventing the pawl from rocking away from either of its supporting bolts 16 and securely retaining the central tooth 19 of the pawl 18 between two of the teeth 7 on the rack 6. When it is desired to move the pawl 18 relative to the rack the longer lever 22 is shifted such as to the dotted line position of Figure 1. This keeps the left hand cam arm 23 in close proximity with the left hand pawl arm 20, but it moves the right hand cam arm 23 away from the right hand pawl arm 20. The rack tooth 7 which lies to the left of the pawl tooth 19 will exert a lateral pressure or resistance to movement of the tooth 19 and the entire pawl 18 will swing upwardly about the left hand supporting bolt 16 to the dotted line position of Figure 1. Thus it will be seen that the pawl will move freely along the toothed rack until the lever 22 is released, the springs 24 realign the levers 22 and 11 and the right hand cam arm 23 again moves down into contact with or close proximity to the right hand pawl arm 20, whereupon the pawl tooth 19 is again locked in position on the toothed rack 6.

Naturally, the lever 22 can be swung to the right and the action will be reversed to permit movement of the pawl unit in the opposite direction since the parts are duplicated on either side in the directions of movement of the pawl.

It will, of course, be understood that various changes may be made in the form, details, arrangement and proportions of the various parts without departing from the scope of my invention.

What I claim is:

1. A double acting pawl unit for use with a toothed rack comprising, a pawl element having a medial portion adapted to be received between the teeth of a rack, said pawl element having arms extending from opposite sides of said medial portion, relatively stationary means for supporting said pawl element for tilting movement relative thereto, a spring yieldably holding said pawl against its supporting means, a shiftable pawl securing member, which, in one position thereof, provides a stop which restrains both arms of said pawl against movement away from said supporting means, and said securing member, in shifted positions thereof to either side of said first mentioned position, releasing one or the other of said pawl arms respectively for movement away from its supporting means.

2. A double acting pawl unit for use with a toothed rack comprising, a relatively stationary pawl frame, a pawl element movable relative to said frame and having a medial portion adapted to be received between the teeth of a rack, said pawl element having laterally extending arms at opposite sides of said medial portion, a pawl securing member, an actuating lever to which said pawl securing member is connected, said securing member lying closely adjacent said arms of said pawl and being shiftable by said lever to selectively release either arm of said pawl and permit rocking of the pawl, and a spring device connected between said frame and said securing member and normally centering said securing member relative to said pawl arms.

3. A double acting pawl unit for use with a toothed rack comprising, a frame, a pawl element rockably supported in said frame and having a medial portion adapted to be received between the teeth of a rack, said pawl element having arms extending laterally in opposite directions from the medial portion of said pawl, a spring yieldably urging said pawl in a rack engaging direction, a shiftable pawl securing member located closely adjacent the arms of said pawl, said pawl securing member in a first position thereof, holding said pawl arms against rocking movement, and said securing member being shiftable to either side of said first position to alternately release said pawl arms to permit selective rocking movement of the pawl, and centering means for said securing member comprising a spring device secured to said frame and engaging said securing member.

4. The structure in claim 3, and said spring device comprising a pair of spring arms extending from said frame to opposite sides of said pawl securing member and being located symmetrically relative to said rockable pawl element.

DONALD C. PETERSON.

REFERENCES CITED

The following references are of record in the file of this patent:

UNITED STATES PATENTS

| Number | Name | Date |
|--------|------|------|
| 566,844 | Crandall | Sept. 1, 1896 |
| 787,843 | Honscheid | Apr. 18, 1905 |

FOREIGN PATENTS

| Number | Country | Date |
|--------|---------|------|
| 266,275 | Great Britain | Feb. 24, 1927 |
| 119,001 | Germany | Apr. 12, 1901 |